Aug. 23, 1960    M. COZZOLI    2,949,863
CARGO HANDLING SYSTEM
Filed Jan. 31, 1957    2 Sheets-Sheet 1
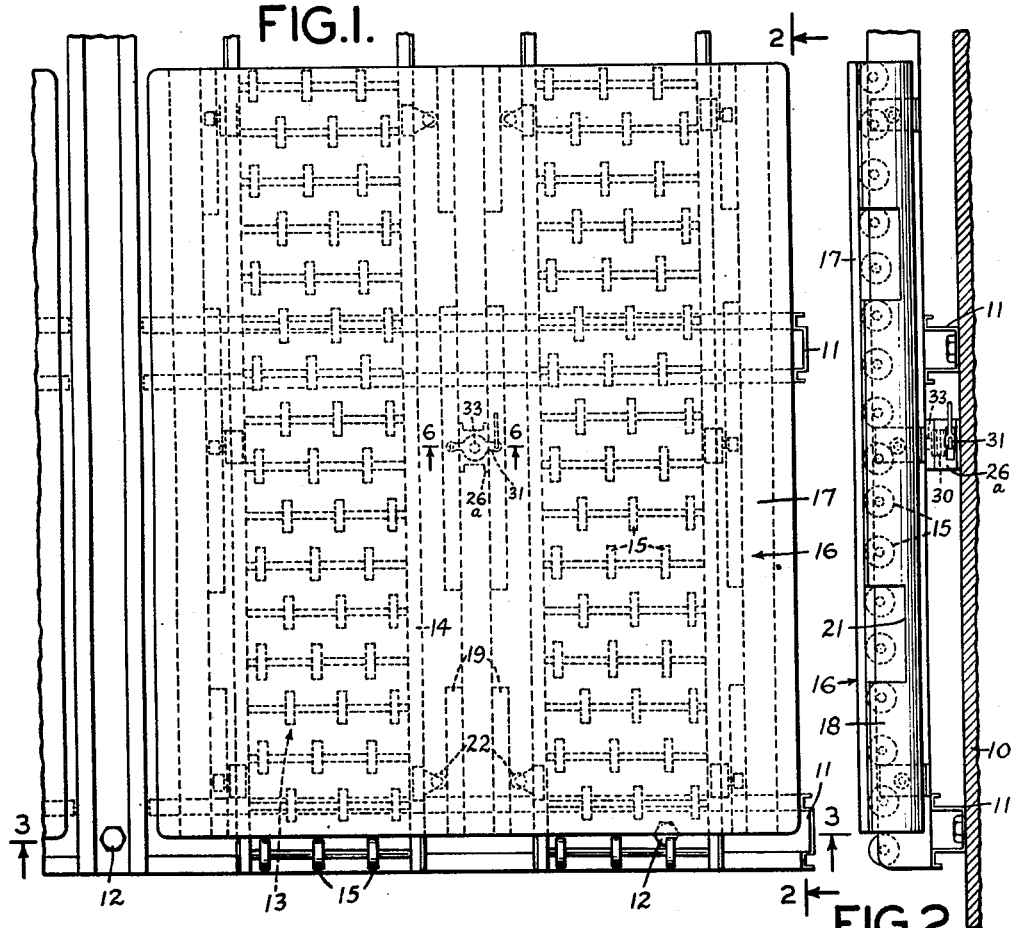
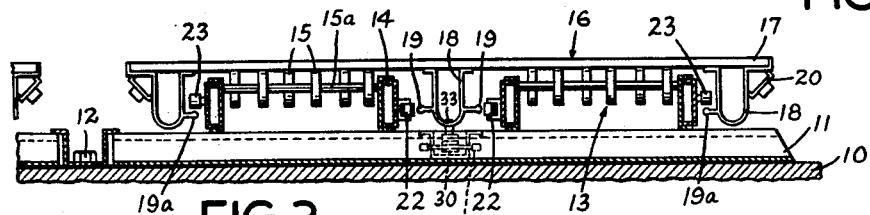
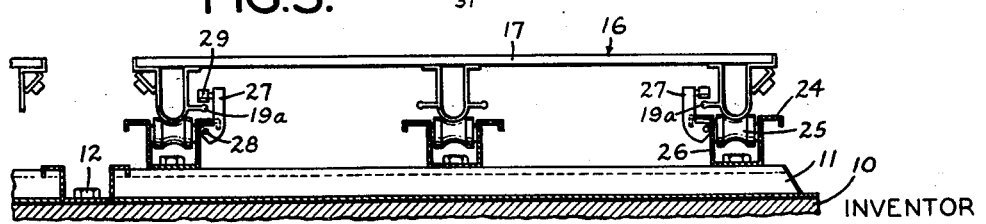
INVENTOR
MICHAEL COZZOLI
BY
Brumbaugh, Free, Graves & Donohue
HIS ATTORNEYS Aug. 23, 1960   M. COZZOLI   2,949,863
CARGO HANDLING SYSTEM
Filed Jan. 31, 1957   2 Sheets-Sheet 2

INVENTOR
MICHAEL COZZOLI
BY
Brumbaugh, Free, Graves & Donohue
HIS ATTORNEYS

United States Patent Office 2,949,863
Patented Aug. 23, 1960

2,949,863

CARGO HANDLING SYSTEM

Michael Cozzoli, Hagerstown, Md., assignor to Fairchild Engine and Airplane Corporation, Hagerstown, Md., a corporation of Maryland Filed Jan. 31, 1957, Ser. No. 637,418

8 Claims. (Cl. 104—135)

This invention relates to apparatus for handling movable cargo in any type of carrier and particularly to cargo handling apparatus for aircraft.

The primary object of this invention is to provide apparatus whereby cargo may be transported from one place to another by any suitable carrier or combination of carriers in a very simple and inexpensive manner.

More specifically, the system of devices of this invention is designed to reduce the time consumed in handling and loading operations, and at the same time to utilize inexpensive and therefore relatively expendable handling equipment during the storage period and delivery operation. The system is particularly adapted for use in supplying troops with supplies and equipment and may be installed in trucks, ships, railroad cars or airplanes to provide the desirable features of interchangeability from one means of transport to another.

The cargo handling apparatus of the present invention comprises a pallet and a stationary supporting means having a plurality of wheels journalled thereon for supporting the pallet. The stationary supporting means is provided with novel restraining means designed to act in cooperation with the pallet to guide the pallet during longitudinal movement thereof relative to the supporting means and to provide lateral and vertical restraint on the pallet when in place on the supporting means. Separate means are also provided to lock the pallet against longitudinal movement of the pallet relative to the supporting means.

The pallet of the present invention has at least two rails on the bottom thereof, the rails being spaced apart for supporting the pallet. The rails each have at least one guide flange attached thereto arranged to cooperate with restraining and guide means on the stationary supporting means.

The stationary supporting means of the present invention may take one of several forms. One embodiment comprises a standard skate roller conveyor having a plurality of wheels journalled therein. The roller conveyor is arranged longitudinally of the cargo space. Where more than one roller conveyor is employed, longitudinal passages between each row of conveyors are provided to receive the pallet rails. The pallet is supported on the roller conveyor by contact of the wheels with the underside of the pallet floor. Restraining and guide means cooperate with guide flanges provided on the pallet rails to prevent lateral and vertical movement of the pallets.

In another embodiment, parallel rows of wheels are journalled in suitable wheel supporting means which are in turn mounted on the platform of the cargo space. The rows of wheels are spaced apart and adapted to receive and guide the pallet rails for longitudinal movement of the pallet relative to the supporting means. This embodiment also includes vertical and lateral restraining means for the pallet mounted on the wheel supporting means and the restraining means are adapted to cooperate with a guide flange on the pallet rail.

It will be seen that in accordance with the invention, cargo bearing pallets may be loaded and stored or transported in the usual manner. The pallet may be approached from each side with a fork-lift device and lifted and handled in the usual manner. Loading of the pallet onto the vehicle is facilitated by the wheeled supporting devices. In addition, unloading of the pallet, particularly from an airplane in flight, is greatly facilitated.

A more detailed description of the cargo handling apparatus of this invention and its advantages will appear from the following detailed description of the attached drawings in which:

Figure 1 is a top plan view of the novel pallet and wheeled supporting structure of this invention;

Figure 2 is a side view in elevation of the device of Figure 1 as seen along the line 2—2 thereof;

Figure 3 is an end view in elevation of the device of Figure 1 as seen along the line 3—3 thereof;

Figure 4 is an end view in elevation of a second embodiment of the present invention;

Figure 5:
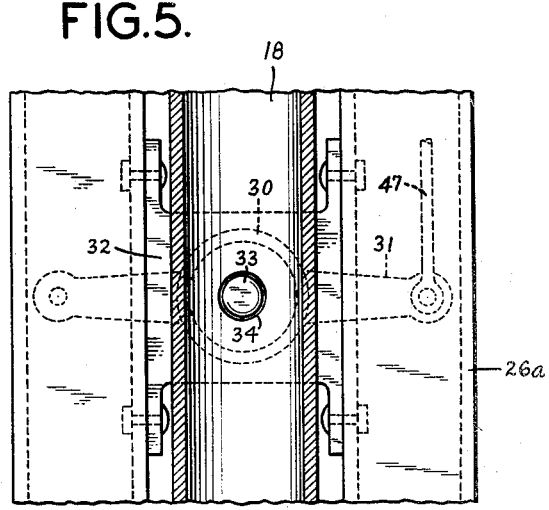
Figure 5 is a top plan view of locking means for preventing longitudinal movement of the pallet of this invention, as seen along line 5—5 of Figure 6.

While the preferred embodiment of the present invention will be described and illustrated in reference to its use in aircraft, it is understood that the cargo handling apparatus is readily adaptable for installation in any other desired means of transportation.

The cargo handling apparatus of this invention is shown in position on the floor 10 of the cargo hold of an airplane fuselage (not shown). A plurality of cross beams 11 are secured to the floor 10 by means of suitable bolts 12. The cross beams 11 support at least one roller conveyor unit 13, longitudinally of the fuselage, two being shown in Figure 1. Where two or more units are employed, they are mounted in parallel relation. The roller conveyor units are of the conventional type and comprise two parallel beams 14, said beams 14 being spaced apart and having a plurality of skate wheels 15 journalled on shafts 15a extending between and supported by the beams. The skate wheels 15 are arranged so that their upper surface are in a common plane substantially parallel to the floor 10.

The pallet 16 of this invention comprises a load bearing platform 17 fabricated of any suitable material such as plywood, sheet metal or metal clad plywood. At least two U-shaped rails 18, and as shown, three, are attached to the underside of the pallet 16, and are spaced apart so as to permit engagement of the skate wheels 15 with the underside of the load bearing platform 17 between the rails 18, as shown in Figures 1 and 2.

A plurality of suitable sling attachments or brackets 20 are fixed to the pallet 16 for use in securing the cargo to the load bearing platform 17. The lateral spacing between the rails 18 allows the fork of a lift truck to engage the pallet 16 from either end, and suitably spaced openings 21 are provided in the rails 18 as shown in Figure 2 for the insertion of a lift truck fork from either side. Thus the pallet 16 can be handled from all sides.

A novel means for restraining the pallets against lateral and vertical movement and tilting is provided in accordance with the present invention and is illustrated in Figures 1 and 3. The restraining means includes guide flanges 19, 19a extending generally horizontally from the rails 18. A series of pairs of opposing rollers 22 are mounted for rotation about vertical axes on the adjacent beams 14 of the two parallel roller conveyors 13 for cooperation with the edges of flanges 19, 19 extending in opposite directions from the center rail 18. The rollers 22 engage the edges of the flanges 19, 19 to guide the pallet during longitudinal movement thereof and prevent lateral movement of the pallet 16.

Vertical movement of the pallet is restrained by means of horizontally disposed rollers 23 mounted on the outer beams 14 of the conveyors 13, 13 so that the rollers will be positioned adjacent to the inner sides of the outer rails 18 of the pallet. The rollers 23 are mounted directly above the flanges 19a on the outer rails 18 and serve to restrain the pallet 16 against vertical movement and tilting when it is in place.

Another embodiment of the invention is illustrated by Figure 4. Referring to this figure, the wheeled supporting means comprises a number of roller tracks 24 for supporting and guiding the pallet 16. At least two parallel rows of roller tracks 24 are required, and in the preferred form, three parallel rows are illustrated, one in the center and two at opposite edges. The grooved wheels 25 forming each track 24 are journalled in a suitable channel-like frame 26, which is in turn secured to cross beams 11 and to the floor 10 of an aircraft. With this arrangement, the grooved wheels 25 of each track 24 serve to both support and guide one of the rails 18 of the pallet 16 during loading and unloading thereof from the aircraft.

Each of the outer tracks 24 is provided with a mechanism for preventing a lateral and vertical movement and tilting of the pallets thereon, including generally L-shaped arms 27 pivotally mounted at their lower lateral ends on pivots 28 secured to the insides of outermost frames 26. Each L-shaped arm 27 carries a roller 29 at its upper end to overlie the flanges 19a on the two outside rails 18 of the pallet 16. The pivots 28 enable the arms 27 to be swung upwardly to their pallet restraining position or swung downwardly to release the pallet. When the arms 27 are swung downwardly from their restraining position, a clean, unobstructed area above the rollers 25 is obtained and cartons, boxes or other containers may be placed directly on the rollers 25 for movement thereon.

Figure 6:
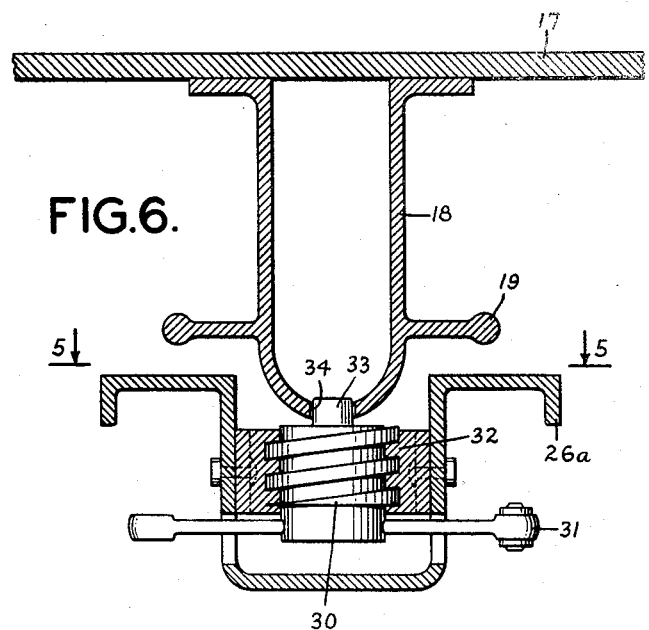
Figure 6 is a section in elevation of the locking means shown in Figure 1 as seen along the line 6—6 thereof.

Locking means are preferably provided on the pallets, and on the rails, or the floor to prevent longitudinal movement of the pallets during transport. Suitable locking means are shown in place in Figures 1, 2 and 3, and in more detail in Figures 5 and 6. Referring to Figures 5 and 6, the preferred locking means comprises a rotatable lock member 30 having an arm 31. The rotatable lock member 30 threadably engages a supporting member 32. The supporting member 32 may be bolted in place on a support 26a on the floor 10 between the cross beams 11, as shown in the embodiment of the invention illustrated by Figures 1, 2 and 3. In the embodiment illustrated by Figure 4, the supporting member 32 may be bolted inside the center channel frame 26 at substantially its midpoint. With both embodiments, a stud-like locking pin 33 on the lock member 30 engages an opening 34 in the lower wall of the center rail 18 of the pallet at substantially its midpoint. Rotation of the lock member 30 in a counterclockwise direction causes the pin 33 to move upwardly and engage the opening 34, thus locking the pallet in place and preventing any shifting of the pallet in a fore and aft direction. Rotation of the lock member 30 in a clockwise direction causes the pin 33 to be withdrawn from the opening 34 and to thereby unlock the pallet.

Locking and unlocking means similar to those described in the copending Cozzoli application, Serial No. 608,343 filed September 6, 1956, may be used to operate the locking means described in detail in Figures 5 and 6. These locking and unlocking means may be connected for example to the push-pull rod 47 shown in Figure 5 of copending application Serial No. 608,343 or to the automatic unlocking means embodied in Figure 13 of the same application. Also, the means set forth in the application Serial No. 608,343 for ejecting the first pallet in a series may be employed if desired.

It will be understood that the above-described embodiments of the invention are illustrative only and that modifications will occur to those skilled in the art. Therefore, the invention is not limited to the specific apparatus disclosed herein, but is to be defined by the appended claims.

I claim:

1. In a cargo handling system, the combination of a stationary supporting means, wheels mounted on said supporting means, a cargo pallet supported on said wheels, roller means mounted on the supporting means for guiding the pallet in longitudinal movement relative to the supporting means, and cooperating means on the pallet and the supporting means for restraining vertical movement of the pallet, said cooperating means including roller means on the supporting means.

2. The apparatus of claim 1 wherein the wheels engage the rails for guiding and supporting the pallet during longitudinal movement of the pallet relative to the supporting means.

3. In a cargo handling system, the combination of a stationary supporting means, wheels mounted on said supporting means, a cargo pallet, at least two rails on the underside of said pallet, guide means on one of said rails, means on said supporting means cooperating with said guide means for guiding the pallet during longitudinal movement thereof relative to the supporting means and cooperating means on the pallet and the supporting means for restraining vertical movement of the pallet, said wheels on said supporting means supporting said palet during longitudinal movement of the pallet relative to the supporting means.

4. The apparatus of claim 3 wherein the wheels on said supporting means engage and support the underside of the pallet floor.

5. In a cargo handling system, the combination of a stationary supporting means, wheels mounted on said supporting means, a cargo pallet, three U-shaped rails on the underside of said pallet, two of said rails being arranged at either edge and one in the center of the pallet, guide flanges extending horizontally from the center rail hold-down flanges extending horizontally from the outer rails, vertical movement restraining rollers horizontally disposed on the stationary supporting means adjacent the outer rails, and lateral movement restraining rollers horizontally disposed on the supporting means adjacent both of the flanges on the center rail, said wheels on said supporting means supporting and guiding said pallet during longitudinal movement of pallet relative to the supporting means, and said rollers cooperating with said flanges to prevent vertical and lateral movement, respectively, of the cargo pallet.

6. In a cargo handling system, the combination of a cargo pallet, at least two rails on the underside of said pallet, at least one hold-down flange on the inner surface of each rail, a stationary track, grooved wheels mounted on said track, said track being arranged to cooperate with the rails to support and guide the pallet during longitudinal movement thereof relative to the track, a lateral and vertical movement restraining member pivotally mounted on the supporting means, and roller means on said member adapted to cooperate with each hold-down flange on each of said rails to restrain lateral and vertical movement of the pallet relative to the track.

7. In a cargo handling system, the combination of a cargo pallet, at least two rails on the underside of said pallet, at least one hold-down flange on the inner surface of each rail, a stationary track, grooved wheels mounted on said track, said track being arranged to cooperate with the rails to support and guide the pallet during longitudinal movement thereof relative to the track, a lateral and vertical movement restraining member pivotally mounted on the supporting means, roller means on said member adapted to cooperate with each hold-down flange on each of said rails, and locking means for restraining fore and aft movement of the pallet.

8. A cargo pallet comprising a pallet floor, at least three U-shaped rails depending downwardly from and supporting the pallet floor, said rails being arranged one at either edge and one under the center of the pallet floor, horizontal inwardly directed flanges fixed on the inner surfaces of each of the outside rails, and horizontal outwardly directed flanges fixed on both sides of the center rail.

References Cited in the file of this patent

UNITED STATES PATENTS

| | | |
|---|---|---|
| 555,081 | Emond | Feb. 25, 1896 |
| 1,094,026 | Simmonds | Apr. 21, 1914 |
| 1,198,605 | Trent | Sept. 19, 1916 |
| 1,334,409 | Sindelar | Mar. 23, 1920 |
| 1,373,754 | Miller | Apr. 5, 1921 |
| 1,408,413 | Smith | Feb. 28, 1922 |
| 1,615,453 | Hencken | Jan. 25, 1927 |
| 1,666,780 | Irwin | Apr. 17, 1928 |
| 1,703,153 | Knoll | Feb. 26, 1929 |
| 1,727,547 | Knoll | Sept. 10, 1929 |
| 1,842,411 | Ladd | Jan. 26, 1932 |
| 2,226,042 | Zane | Dec. 24, 1940 |
| 2,439,986 | Rennie | Apr. 20, 1948 |
| 2,751,853 | Templeton | June 26, 1956 |